United States Patent
Huang et al.

(10) Patent No.: US 10,012,535 B2
(45) Date of Patent: Jul. 3, 2018

(54) DISPERSIVE ELEMENT AND SPECTROMETER USING THE SAME

(71) Applicant: National Chiao Tung University, Hsinchu (TW)

(72) Inventors: Cheng-Sheng Huang, Hsinchu (TW); Hsin-An Lin, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 14/965,695

(22) Filed: Dec. 10, 2015

(65) Prior Publication Data
US 2017/0059405 A1 Mar. 2, 2017

(30) Foreign Application Priority Data

Sep. 1, 2015 (TW) .............................. 104128875 A

(51) Int. Cl.
| | | |
|---|---|---|
| *G01J 3/02* | (2006.01) | |
| *G01J 3/18* | (2006.01) | |
| *G01J 3/26* | (2006.01) | |

(52) U.S. Cl.
CPC ............ *G01J 3/0205* (2013.01); *G01J 3/0218* (2013.01); *G01J 3/1804* (2013.01); *G01J 3/26* (2013.01)

(58) Field of Classification Search
CPC ....... G01J 3/0229; G01J 3/0221; B82Y 20/00; B82Y 30/00; B82Y 10/00; G02B 6/12007; G02B 6/34; G02B 6/1225; G02B 2006/12107; G02B 6/43; G02B 6/42; G01N 33/54373; G01N 21/553
See application file for complete search history.

(56) References Cited

U.S. PATENT DOCUMENTS

| | | | | | |
|---|---|---|---|---|---|
| 4,776,661 | A | * | 10/1988 | Handa ................ | G02B 6/12004 385/130 |
| 5,887,094 | A | * | 3/1999 | Bakhti ............... | G02B 6/02095 385/27 |
| 6,198,863 | B1 | * | 3/2001 | Lealman ............ | G02B 6/12007 372/102 |

(Continued)

OTHER PUBLICATIONS http://www.eserc.stonybrook.edu/ProjectJava/Bragg/.*
https://en.wikipedia.org/wiki/Tantalum_pentoxide.*
http://www.thefreedictionary.com/spectrometer.*

*Primary Examiner* — Mohamed K Amara
(74) *Attorney, Agent, or Firm* — Muncy, Geissler, Olds & Lowe, P.C.

(57) ABSTRACT

A dispersive element is incorporated with an optical sensor as a spectrometer. The dispersive element includes a guided-mode resonance filter having a plurality of resonance regions. The resonance regions respectively have different filter characteristics, each reflecting a first light beam of a tested light source or transmitting a second light beam of the tested light source light source to the optical sensor, wherein the wavelength of the first light beam is different from that of the second light beam. In one embodiment, the dispersive element is incorporated with an optical sensor to form a miniature, high-resolution and low-cost spectrometer. The spectrometer makes use of the transmission efficiencies of the resonance regions of the guided-mode resonance filter and the light intensity distribution detected by the photo-sensitive regions of the optical sensor to acquire the spectral data of the tested light source.

25 Claims, 7 Drawing Sheets

(56) References Cited

U.S. PATENT DOCUMENTS

| | | | | |
|---|---|---|---|---|
| 6,847,746 B2* | 1/2005 | Uchiyama | B01L 3/5085 | |
| | | | 385/12 | |
| 7,167,615 B1* | 1/2007 | Wawro | G01N 21/648 | |
| | | | 385/12 | |
| 8,076,090 B2* | 12/2011 | Fang | G01N 33/54373 | |
| | | | 435/29 | |
| 8,976,359 B2* | 3/2015 | Guo | G01N 21/554 | |
| | | | 356/301 | |
| 2002/0076154 A1* | 6/2002 | Maisenhoelder | G01N 21/552 | |
| | | | 385/37 | |
| 2002/0181532 A1* | 12/2002 | Ryu | H01S 5/12 | |
| | | | 372/50.121 | |
| 2003/0039442 A1* | 2/2003 | Bond | G02B 6/12007 | |
| | | | 385/37 | |
| 2003/0133640 A1* | 7/2003 | Tiefenthaler | G01N 21/648 | |
| | | | 385/12 | |
| 2010/0014073 A1* | 1/2010 | Hashiguchi | B82Y 20/00 | |
| | | | 356/128 | |
| 2010/0322558 A1* | 12/2010 | Ogawa | G02B 6/12007 | |
| | | | 385/37 | |
| 2011/0013269 A1* | 1/2011 | Ogawa | G02B 6/12007 | |
| | | | 359/341.1 | |
| 2011/0051772 A1* | 3/2011 | Fukuda | B82Y 20/00 | |
| | | | 372/50.11 | |
| 2011/0090931 A1* | 4/2011 | Murata | B82Y 20/00 | |
| | | | 372/50.11 | |
| 2013/0058370 A1* | 3/2013 | Chang-Hasnain | B82Y 20/00 | |
| | | | 372/50.11 | |
| 2014/0080729 A1* | 3/2014 | Grego | G01N 21/05 | |
| | | | 506/9 | |
| 2014/0268332 A1* | 9/2014 | Guo | G02B 5/008 | |
| | | | 359/487.01 | |
| 2015/0063753 A1* | 3/2015 | Evans | G02B 6/34 | |
| | | | 385/37 | |
| 2015/0131942 A1* | 5/2015 | Xu | G02B 6/34 | |
| | | | 385/37 | |

* cited by examiner

DISPERSIVE ELEMENT AND SPECTROMETER USING THE SAME

BACKGROUND OF THE INVENTION

1. Field of the Invention

The present invention relates to a spectrometer and a dispersive element, particularly to a miniature dispersive element and a miniature spectrometer using the same.

2. Description of the Prior Art

A conventional spectrometer normally adopts prisms, an optical grating, or an interferometer to disperse a light beam, wherein the spectral resolution must compromise with the volume. Therefore, the conventional high-resolution spectrometers are bulky, complicated and more expensive. Among the high-resolution spectrometers, the prism-type spectrometer is too bulky to miniaturize. The interference spectrometer has so complicated an optical design that impairs the miniaturization thereof although it has higher resolution.

Hence, the fields concerned are eager to develop a miniature, high-resolution and low-cost spectrometer.

SUMMARY OF THE INVENTION

The present invention provides a dispersive element and a spectrometer using the same, wherein a gradient guided-mode resonance filter is used in the light dispersive element to realize a miniature and high-resolution spectrometer.

In one embodiment, the dispersive element of the present invention is incorporated with an optical sensor and a computation unit to form a spectrometer. The dispersive element comprises a guided-mode resonance filter having a plurality of resonance regions disposed along a direction vertical to tested light of a tested light source with an unknown spectrum, wherein the tested light source and the optical sensor are disposed at opposite sides of the guided-mode resonance filter. Each of the resonance regions respectively has different a filter characteristic, each reflecting a first light beam of the tested light source or transmitting a second light beam of the tested light source to the optical sensor, wherein the wavelength of the first light beam is different from the wavelength of the second light beam, wherein the filter characteristics include a transmission efficiency matrix T containing i×j pieces of transmission elements, and wherein i is a count of the resonance regions, and wherein j is a count of reference light beams respectively having different wavelengths, and wherein each the transmission element represents a transmission efficiency of one the reference light beam having one the wavelength in one the resonance region, and wherein each transmission element is verified beforehand with the reference light beams having different known wavelengths to determine the transmission efficiency matrix T of the filter characteristics: wherein the optical sensor includes a plurality of photosensitive regions respectively corresponding to the resonance regions, receiving the first light beams or the second light beams to acquire a light intensity distribution, wherein the light intensity distribution includes a light intensity matrix C containing i pieces of light intensity elements: i is a count of the resonance regions: and each light intensity element represents a light intensity of the first light beam or the second light beam, which is detected by one photosensitive region corresponding to one resonance region: wherein the computation unit is configured for working out a spectral data of the tested light source according to the light intensity distribution and the filter characteristics which are verified and stored beforehand in the computation unit, wherein the spectral data includes a frequency spectrum matrix I containing j pieces of frequency spectrum elements: j is a count of reference light beams respectively having different known wavelengths: and each frequency spectrum element denotes a dispersion intensity of the tested light source with the unknown spectrum, which is corresponding to one wavelength of one reference light beam: and wherein a transposed matrix $T^T$ of the transmission efficiency matrix and the light intensity matrix C are obtained via measurement: and the computation unit obtains the frequency spectrum matrix I according to an equation $C=I \cdot (T^T)$.

In one embodiment, the spectrometer of the present invention comprises a dispersive element, an optical sensor and a computation unit. The dispersive element includes a guided-mode resonance filter having a plurality of resonance regions disposed along a direction vertical to tested light of a tested light source with an unknown spectrum, wherein the tested light source and the optical sensor are disposed at opposite sides of the guided-mode resonance filter. Each of the resonance regions respectively has different a filter characteristic, each reflecting a first light beam of the tested light source or transmitting a second light beam of the tested light source to the optical sensor, wherein the wavelength of the first light beam is different from the wavelength of the second light beam. The filter characteristics include a transmission efficiency matrix T containing i×j pieces of transmission elements; i is a count of the resonance regions; j is a count of reference light beams respectively having different known wavelengths; each transmission element represents a transmission efficiency of one reference light beam having one wavelength in one resonance region, and each transmission element is verified beforehand with the reference light beams having different known wavelengths to determine the transmission efficiency matrix T of the filter characteristics. The optical sensor includes a plurality of photosensitive regions respectively corresponding to the resonance regions. The computation unit works out a spectral data according to the intensity distribution and the filter characteristics which are verified and stored beforehand in the computation unit; wherein the light intensity distribution includes a light intensity matrix C containing i pieces of light intensity elements; i is a count of the resonance regions; each the light intensity element represents a light intensity of the first light beam or the second light beam, which is detected by one the photosensitive region corresponding to one the resonance region; and the spectral data includes a frequency spectrum matrix I containing j pieces of frequency spectrum elements; j is a count of reference light beams respectively having different known wavelengths; each the frequency spectrum element denotes a dispersion intensity of the tested light source with the unknown spectrum, which is corresponding to one the wavelength of one the reference light beam; and wherein a transposed matrix $T^T$ of the transmission efficiency matrix and the light intensity matrix C are obtained via measurement; the computation unit obtains the frequency spectrum matrix I according to an equation $C=I \cdot (T^T)$.

Below, embodiments are described in detail in cooperation with the attached drawings to make easily understood the objectives, technical contents, characteristics and accomplishments of the present invention.

DESCRIPTION OF THE PREFERRED EMBODIMENTS

Figure 1:
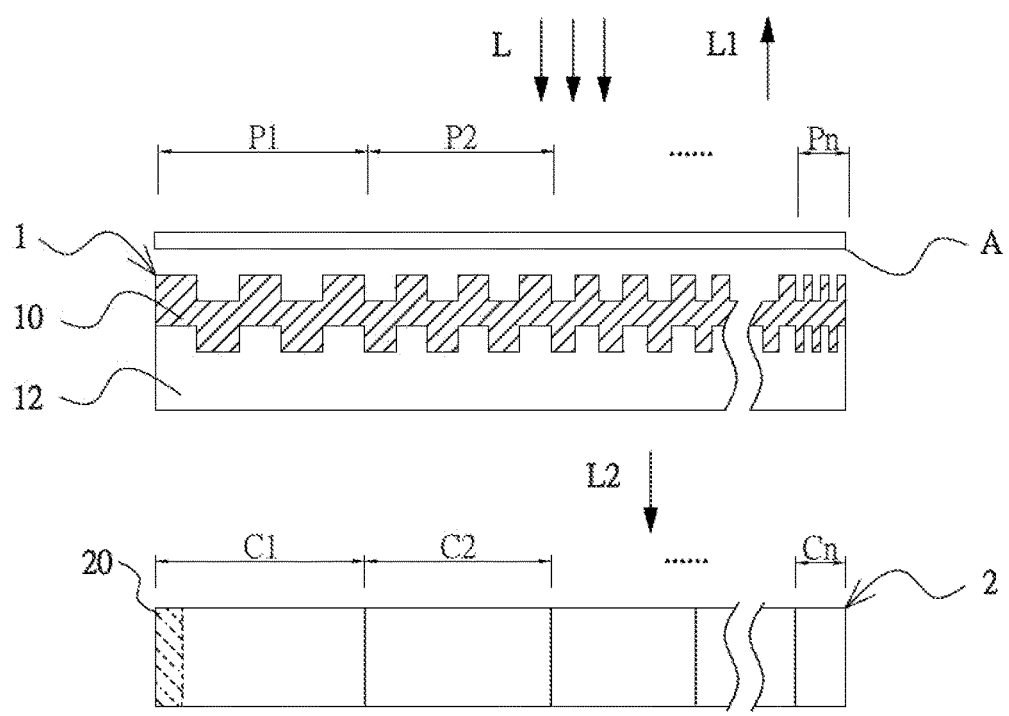
FIG. 1 is a side view schematically showing a spectrometer according to one embodiment of the present invention.

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Refer to FIG. 1 a side view schematically showing a dispersive element according to one embodiment of the present invention. The dispersive element of the present invention is incorporated with an optical sensor 2 to form a spectrometer. The dispersive element comprises a guided-mode resonance filter 1 having a plurality of resonance regions P1, P2, ..., Pn. The resonance regions respectively have different filter characteristics. In other words, the present invention adopts a gradient guided-mode resonance filter. In one embodiment, the resonance regions respectively have optical gratings of different periods in a direction vertical to the tested light source. In one embodiment, the resonance regions respectively have waveguides of different thicknesses in a direction vertical to the tested light source. In one embodiment, the resonance regions respectively have different refractivities in a direction vertical to the tested light source. In one embodiment, the guided-mode resonance filter 1 is a photonic crystal. In one embodiment, the guided-mode resonance filter 1 is a waveguide grating structure where a dielectric layer 10 is disposed on a light permeable layer 12, wherein the refractive index of the dielectric layer 10 is greater than that of the light permeable layer 12. In one embodiment, the dielectric layer 10 is made of a material selected from a group including $TiO_2$, $SiN_x$, $ZnO$, $ZrO_2$, $Ta_2O_5$, $Nb_2O_5$, and $HfO_2$; the light permeable layer 12 is made of a material selected from a group including glass, quartz, and plastic materials. In some embodiments, the present invention adopts different materials to fabricate the dielectric layer or the light permeable layer for different frequency bands.

It should be understood: as the resonance regions respectively have different filter characteristics, the coupled resonance wavelength of a resonance region (corresponding to the tested light source L), i.e. the wavelength of a first light beam, varies with the period of the waveguide grating or the thickness of the waveguide. If the tested light source L is an unpolarized light beam or a natural light beam, it must be processed by a polarization element A to have a specified polarization direction before the tested light source L is incident to the guided-mode resonance filter 1, as shown in FIG. 1. If the tested light source L is a polarized light beam intrinsically, the polarization process is unnecessary.

Figure 2:
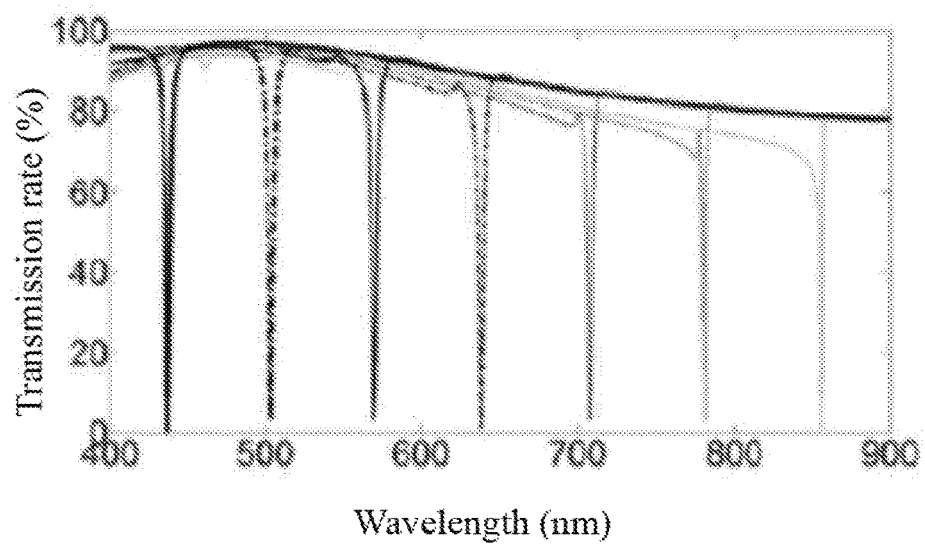
FIG. 2 shows curves of the relationship of transmission rates and wavelengths of the incident light beam in the resonance regions with different grating periods according to one embodiment of the present invention.
Figure 3:
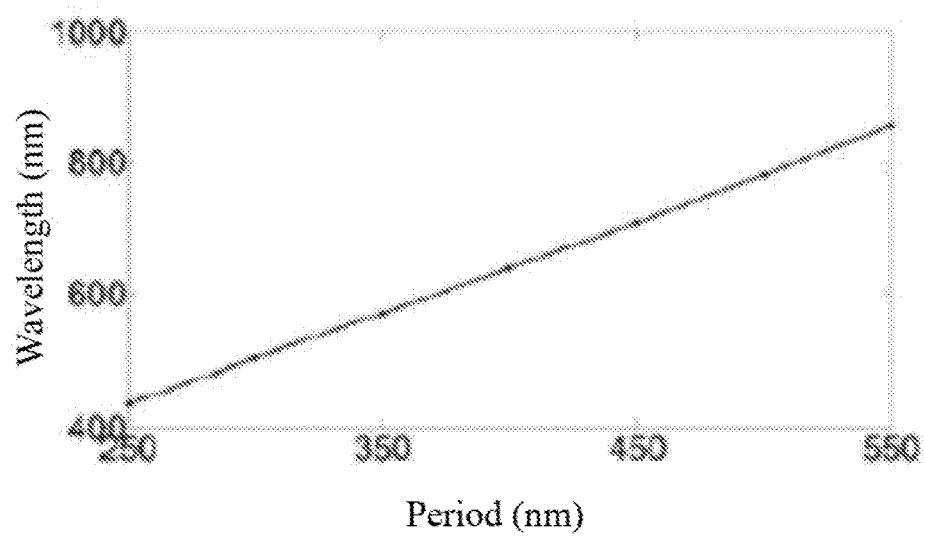
FIG. 3 shows a curve of the relationship of the wavelengths of resonating light beams and the periods of the optical gratings according to one embodiment of the present invention.

In one embodiment, the guided-mode resonance filter has gradient waveguide grating periods, and the resonance regions have gradually-decreasing resonance frequencies along a direction vertical to the tested light source L. Therefore, different resonance regions respectively have different coupled resonance wavelengths, each reflecting a first light beam L1 having a special coupled resonance wavelength or transmitting a second light beam L2 of the tested light source L, wherein the wavelength of the first light beam L1 is different from the wavelength of the second light beam L2. Refer to FIG. 2 and FIG. 3. In one embodiment, the waveguide grating period of a first resonance region is 250 nm; the transmission rates of different wavelengths of the incident light beam are shown in the first curve (solid curve) in the left of FIG. 2; the reflected resonance light beam of the first resonance region has a wavelength of about 430 nm. In the same embodiment, the waveguide grating period of a second resonance region is 300 nm; the transmission rates of different wavelengths of the incident light beam is shown in the second curve (dotted curve) in the left of FIG. 2; the reflected resonance light beam of the second resonance region has a wavelength of about 510 nm. In brief, the resonance regions respectively correspond to different coupled resonance wavelengths (the wavelengths of the first light beams L1). Thus, a wideband reference light beam having different known wavelengths or a plurality of reference light beams respectively having different known wavelengths is used to verify the plurality of resonance regions with gradient grating periods to acquire the linear relationship between the grating periods and the coupled resonance wavelengths, as shown in FIG. 3.

For convenience of computation, the transmission rates are used to represent the optical characteristics of the resonance regions and thus acquire a transmission efficiency matrix T of the guided-mode resonance filter having gradient grating periods. The matrix includes i (row)×j (column) pieces of transmission elements $t_{ij}$, wherein i is the number of the resonance regions and j is the number of the reference light beams respectively having different wavelengths. Thus, $t_{ij}$ represents the transmission efficiency of a resonance region to a reference light beam with a specified wavelength. In the embodiment shown in FIG. 2, the reference light source having at least 7 known wavelengths (including 430 nm, 510 nm, 560 nm, 710 nm, 770 nm and 860 nm) illuminates a guided-mode resonance filter having gradient grating periods. The guided-mode resonance filter totally has 7 resonance regions, such as a first resonance region having a grating period of 250 nm and a second resonance region having a grating period of 300 nm. Via measuring the reflected first light beam or the transmitted second light beam, it is learned: the transmission rate of the reference light beam of the reference light source, which has a given wavelength and resonates in a grating with a specified period, is not necessarily zero but must be measured practically. The 7 (row)×7 (column) pieces of transmission elements $t_{ij}$ of the transmission efficiency matrix T of the guided-mode resonance filter contains are acquired via practical measurement. For an example, $t_{21}$=92% means that the 430 nm-wavelength reference light beam has a 92% transmission rate in the second resonance region, i.e. the ratio of the intensity of the second light beam L2 to the intensity of the 430 nm-wavelength reference light beam is 92%. For another example, $t_{22}$=2% means that the 510 nm-wavelength reference light beam has a 2% transmission rate in the second resonance region, i.e. the ratio of the intensity of the second light beam L2 to the intensity of the 510 nm-wavelength reference light beam is 2%. The other cases are similar to those mentioned above and will not repeat herein. The abovementioned transmission efficiency measurements are only to exemplify the present invention but not to limit the present invention.

It is easily understood: the guided-mode resonance filter can be miniaturized via the existing nanometric process. The waveguide grating periods of the resonance regions can be gradually varied in a nanometric scale, whereby the guided-mode resonance filter is miniaturized with a high dispersion effect and a high resolution. Suppose that the first resonance region has a waveguide grating period T1, that the second resonance region has a waveguide grating period T2, . . . , that there are totally n resonance regions, and that m is the number of the periods in each resonance region. Thus, the length of the guided-mode resonance filter is (T1+T2+ . . . +Tn)×m. Limited by the capability of the existing semiconductor process and equipment, the period of the waveguide grating has an increment of 2 nm. In one embodiment, the period of the waveguide grating has an increment of 2 nm in the range of 250-388 nm and repeats 100 times in each resonance region. Thus, the guided-mode resonance filter has a length of 2.23 mm. It is proved by verification: the incidence of a TE polarized beam on the guided-mode resonance filter can generate a resonance mode within the range of 506-700 nm. It is easily understood: the persons having ordinary knowledge in the field can modify the parameters of the guided-mode resonance filter, such as the lengths of the waveguide grating periods, the increment of the grating periods, the number of the resonance regions, the number of the periods in each resonance region, to realize a miniaturized spectrometer for detecting the light source in the range of microwave, infrared light, or visible light. For example, the guided-mode resonance filter applied to microwave has fewer periods in each resonance region than that applied to visible light and thus has a shorter length and a wider range of working wavelength. The abovementioned embodiments are only to exemplify the present invention but not limit the scope of the present invention. The persons having ordinary knowledge in the field should be able to make modification or variation without departing from the scope of the present invention.

In one embodiment, the dispersive element further includes an optical element disposed in the light input side for guiding the tested light source to the plurality of resonance regions. In one embodiment, the optical element is a collimator lens. In one embodiment, the optical element is an optical fiber, which can make the dispersive element be miniaturized further more easily. However, the present invention does not limit that the optical element must be a collimator lens or an optical fiber.

Figure 4:
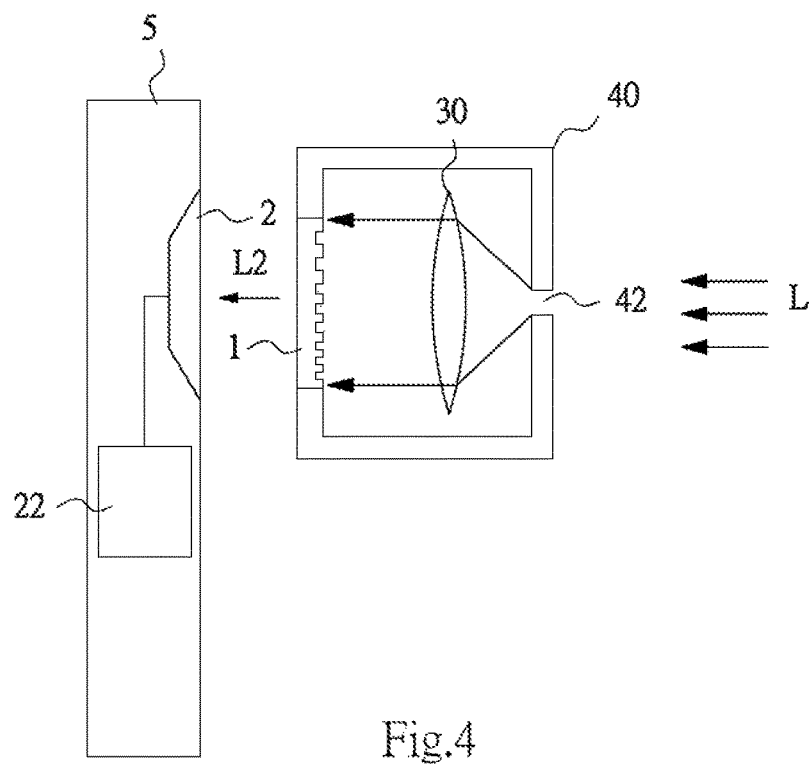
FIG. 4 is a diagram schematically showing a dispersive element and a spectrometer using the same according to one embodiment of the present invention.

Refer to FIG. 4. In one embodiment, the dispersive element includes a collimator lens 30 and a housing 40. The housing 40 has a slit or aperture 42. The guided-mode resonance filter 1 and the slit/aperture 42 are oppositely disposed in the housing 40. The collimator lens 30 is disposed between the guided-mode resonance filter 1 and the slit/aperture 42. The miniaturized dispersive element can be more easily integrated with an optical sensor 2 of a portable device 5, such as a lens of a smart phone, to form a spectrometer, which is lightweight and easy to carry about.

Figure 5:
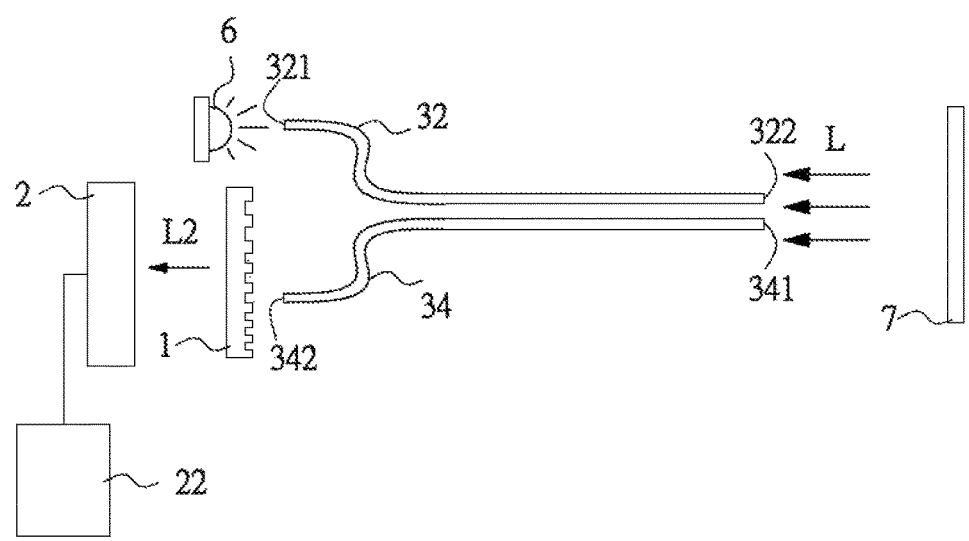
FIG. 5 is a diagram schematically showing a dispersive element and a spectrometer using the same according to another embodiment of the present invention.
Figure 6:
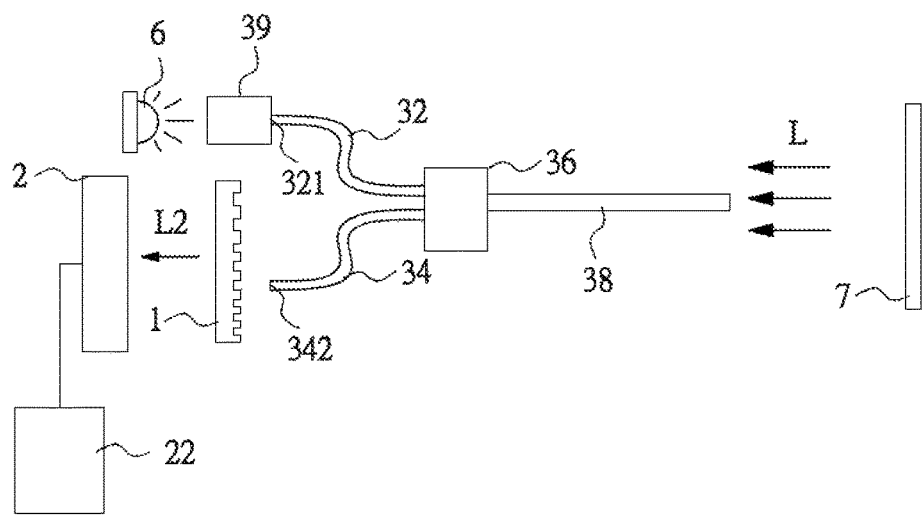
FIG. 6 is a diagram schematically showing a dispersive element and a spectrometer using the same according to yet another embodiment of the present invention.

Refer to FIG. 5. In one embodiment, the dispersive element includes a first optical fiber 32 and a second optical fiber 34. The first fiber 32 has a first light input 321 and a first light output 322. An external light source 6 is input into the first optical fiber 32 through the first light input 321, guided by the first optical fiber 32 and output from the first output 322 to a tested sample 7 for generating a tested light source L. The second optical fiber 34 has a second light input 341 and a second light output 342. The tested light source L is input into the second optical fiber 34 through the second light input 341, guided by the second optical fiber 34 and output from the second light output 342 to the guided-mode resonance filter 1. Refer to FIG. 6. In one embodiment, the dispersive element further includes an isolator 36, whereby the first light output segment of the first fiber 32 and the second light input segment of the second fiber 34 are integrated into a fiber segment 38, and whereby the space occupied by the fibers is reduced. In one embodiment, the dispersive element further includes a collimator 39 connected with the first light input 321 of the first optical fiber 32.

It is easily understood: the length of the guided-mode resonance filter will be varied according to the wavelength range to be dispersed. For example, if the wavelength of the light beam to be detected is smaller than 350 nm, the length of the guided-mode resonance filter will be smaller than 1.14 mm, which will make the dispersive element be miniaturized further more easily.

Figure 7:
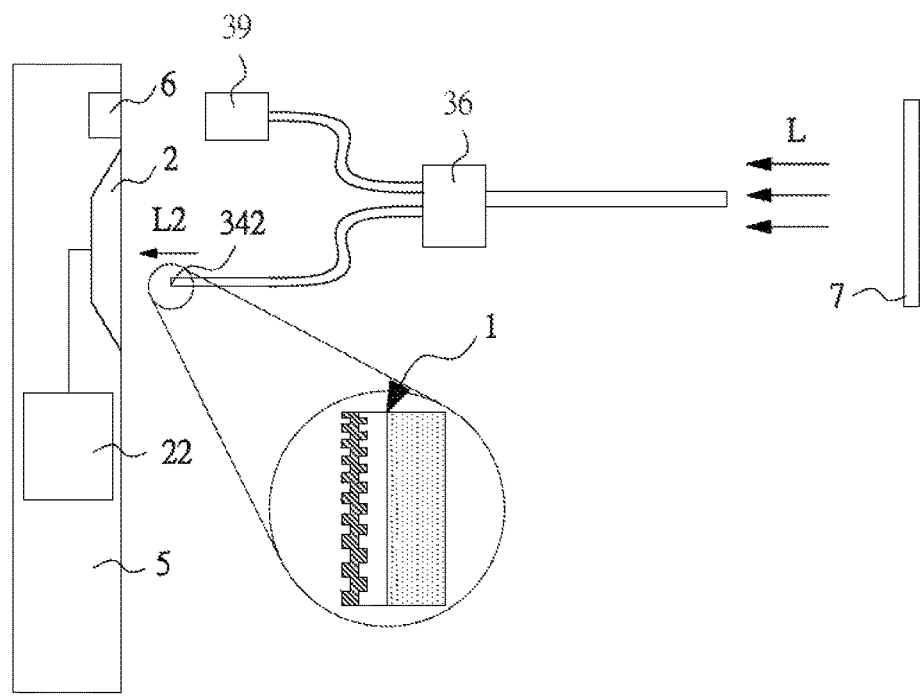
FIG. 7 is a diagram schematically showing a dispersive element and a spectrometer using the same according to a further embodiment of the present invention.

Refer to FIG. 7. In one embodiment, the wavelength range of the dispersed light is smaller, and a guided-mode resonance filter 1 having a length of about 50 um is sufficient to filter the wavelengths to be detected; the guided-mode resonance filter 1 is connected with or embedded in the second light out 432, whereby the dispersive element can be miniaturized further more easily.

Below are described the application and the algorithm of a spectrometer according to one embodiment of the present invention. Refer to FIG. 4 again. In one embodiment, the spectrometer of the present invention comprises a dispersive element, an optical sensor 2 and a computation unit 22. The technical contents of the dispersive element have been described hereinbefore and will not repeat herein. The optical sensor 2 includes a plurality of photosensitive regions respectively corresponding to the plurality of resonance regions. For example, the photosensitive region may be a pixel or defined alternatively. In one embodiment, the present invention defines that the photosensitive regions have a number identical to that of the resonance regions and respectively correspond to the resonance regions. In one embodiment, the optical sensor 2 is a charge coupled device (CCD). The optical sensor 2 receives the first light beams L1 or the second light beams L2 to acquire a light intensity distribution. In one embodiment, the light intensity distribution includes a light intensity matrix C. The light intensity matrix C contains i pieces of light intensity elements, wherein i is the number of the photosensitive regions or resonance regions. Therefore, a light intensity element $C_i$ represents the light intensity of the first light beam L1 or the second light beam L2, which is detected by one photosensitive region corresponding to a resonance region.

It should be explained herein: the light intensity matrix C received by the optical sensor is determined by the spectrum matrix I of the tested light source and the transposed matrix $T^T$ of the transmission efficiency matrix T of the guided-mode resonance filter, wherein $C=I\cdot(T^T)$. For example, after a tested light source with an unknown spectrum is transmitted through the dispersive element, the plurality of photosensitive regions detects the intensities of the transmitted second light beams to acquire a physical light intensity matrix C. The guided-mode resonance filter of the dispersive element can be tested with a reference light beam having a plurality of known wavelengths beforehand to determine the transmission efficiency matrix T, which has been described hereinbefore and will not repeat herein.

According to the light intensity matrix C involving the light intensity distribution and the transmission efficiency matrix T involving the filter characteristics, the computation unit 22 can resume the spectral data of the tested light source. The unknown spectral data includes a frequency spectrum matrix I. The frequency spectrum matrix I involves j pieces of frequency spectrum elements, wherein j represents the number of the reference light beams respectively having different wavelengths. Therefore, a frequency spectrum element $I_j$ denotes the dispersion intensity of the tested light source, which is corresponding to a wavelength of a reference light beam. In brief, the transposed matrix $T^T$ of the transmission efficiency matrix and the light intensity matrix C are obtained via measurement; according to an equation $C=I\cdot(T^T)$, the computation unit 22 uses matrix operations or other numerical methods to obtain the frequency spectrum matrix I, i.e. the spectral data of the tested light source, such as the light intensity distribution of the tested light source.

In one embodiment, the dispersive element has a guided-mode resonance filter with period gradient, wherein the periods of the optical gratings range from 250 to 388 nm with an increment of 2 nm, and wherein each resonance region has 100 periods. Below, the tested light source with 506-700 nm wavelengths is used to verify the abovementioned dispersive element, and the experimental result will be compared with the result of a commercial spectrometer Ocean Optics 2000+.

Figure 8:
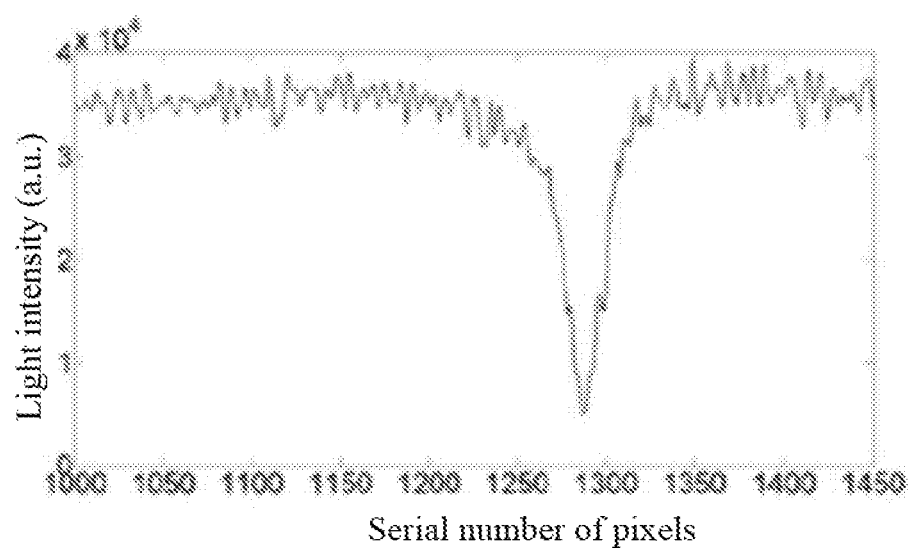
FIG. 8 is a curve diagram showing intensities of a transmitted light beam according to one embodiment of the present invention.
Figure 9:
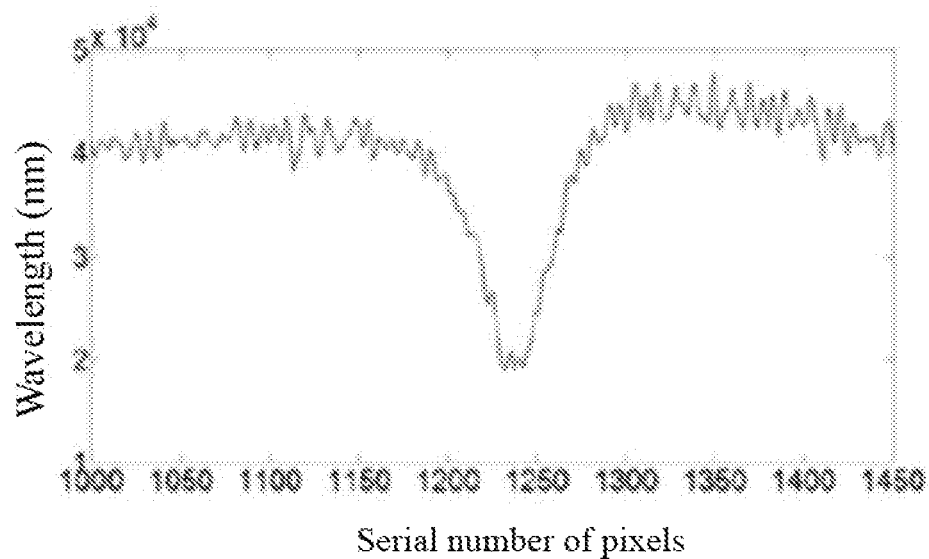
FIG. 9 is a curve diagram showing intensities of a transmitted light beam according to another embodiment of the present invention.

The spectra of two different light sources will be measured, respectively a first red light beam having a wavelength of 600 nm and a second red light beam having a wavelength of about 630-650 nm. The first red light beam is emitted to the dispersive element and transmitted to a charge coupled device, and the charge coupled device measures the light intensities received by the pixels of the photosensitive regions, as shown in FIG. 8. Similarly, the second red light beam is emitted to the dispersive element and transmitted to a charge coupled device, and the charge coupled device measures the light intensities received by the pixels of the photosensitive regions, as shown in FIG. 9.

Figure 10:
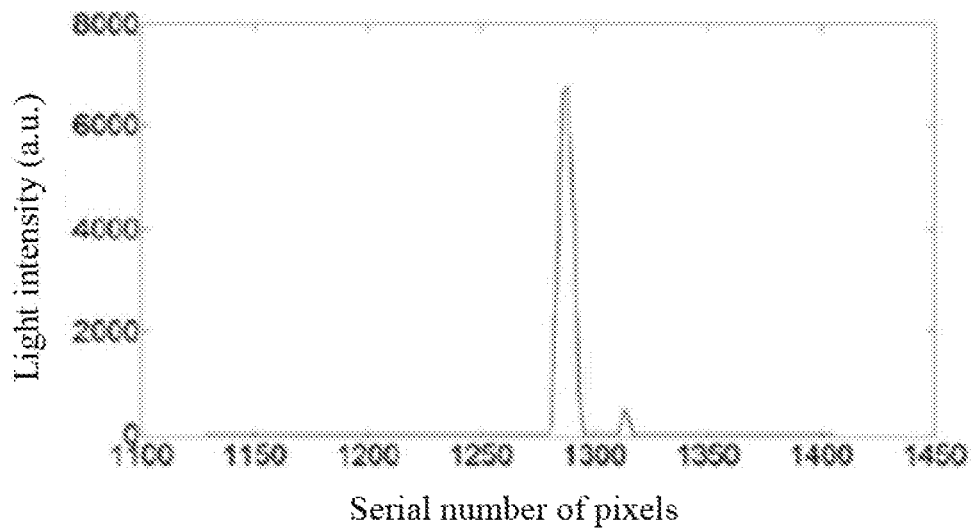
FIG. 10 is a curve diagram showing an intensity distribution of a reference light beam according to one embodiment of the present invention.
Figure 11:
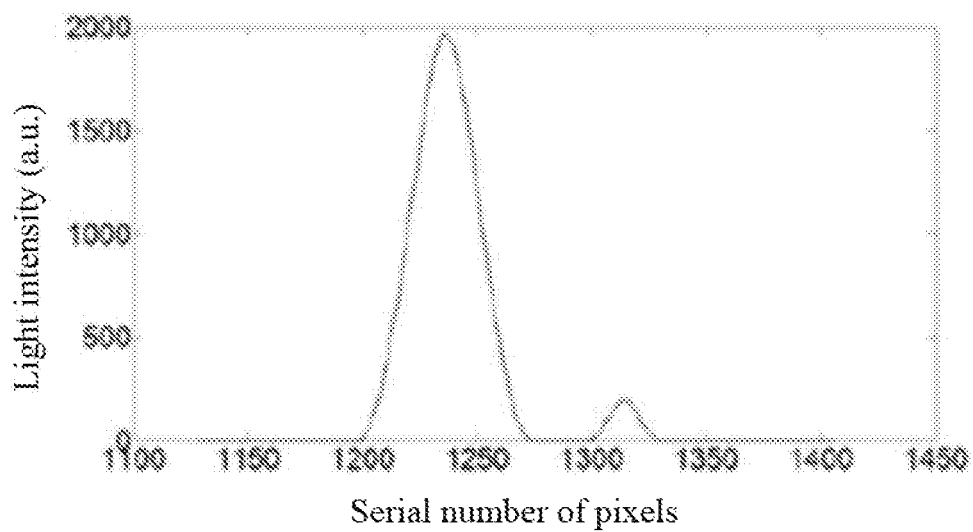
FIG. 11 is a curve diagram showing an intensity distribution of a reference light beam according to another embodiment of the present invention.
Figure 12:
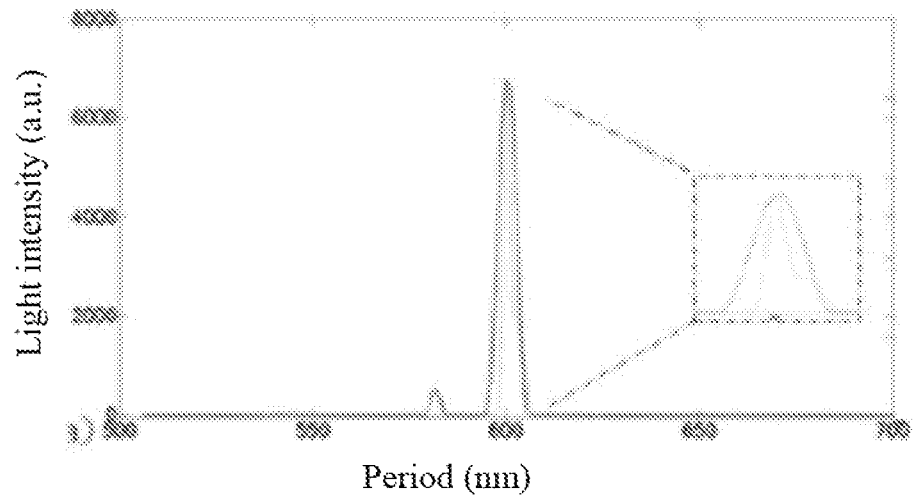
FIG. 12 is a curve diagram showing a reduced spectrum of a reference light beam according to one embodiment of the present invention.
Figure 13:
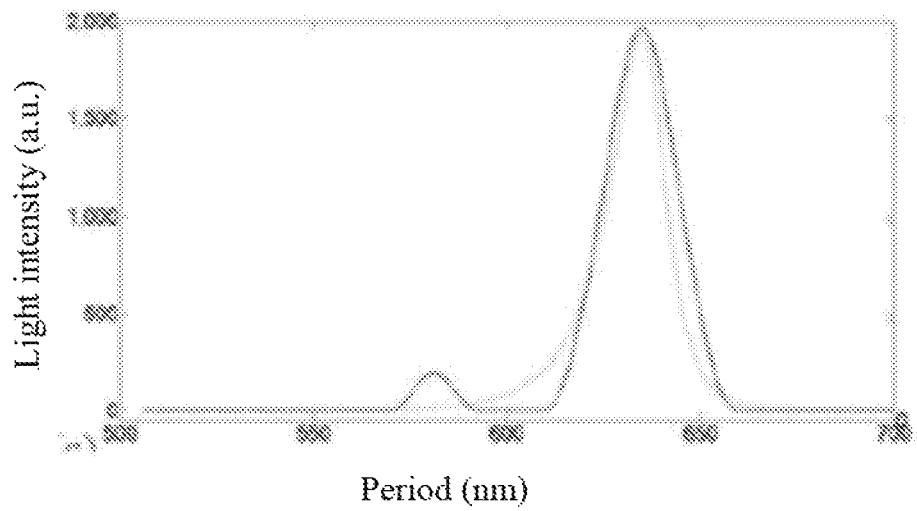
FIG. 13 is a curve diagram showing a reduced spectrum of a reference light beam according to another embodiment of the present invention.

Next, the light intensity distribution acquired by the charge coupled device is used to rebuild the incident light beam. The transmission efficiency matrix and numerical operations are used to work out the light intensity distribution shown in FIG. 10 and FIG. 11 where the horizontal axis represents the pixels and the vertical axis represents the worked out light intensity distribution. Different reference light beams incident to the guided-mode resonance filter generate different resonance spectra in the charge coupled device. The resonance frequency spectra of different reference light beams can be used to obtain the corresponding relationship between the wavelengths of the reference light beams and the pixels of the charge coupled device. Then, the serial numbers of the pixels in FIG. 10 and FIG. 11 are converted into wavelengths. The result of conversion is compared with the spectrum generated by the commercial spectrometer, as shown in FIG. 12 and FIG. 13. Thus is proved that the spectrometer of the present invention can be used to analyze the peaks and spectral data of a tested light source.

The above results prove that the spectrometer of the present invention can accurately measure the peaks. A more sophisticated fabrication process of the guided-mode resonance filter and a more delicate and careful experimental environment can be used to optimize the spectrometer of the present invention and the output thereof so as to correct the slight difference between the output of the present invention and the output of the commercial spectrometer.

In conclusion, the dispersive element and spectrometer of the present invention use a guided-mode resonance filter having gradient to disperse light beams and use the resonance regions of the guided-mode resonance filter and the photosensitive regions of the optical sensor to obtain the transmission efficiency and the spectral data of the tested light source, whereby to realize a miniature, high-resolution and low-cost spectrometer. The present invention uses the existing nanometric process to miniaturize the guided-mode resonance filter, wherein the periods of the waveguide gratings of the resonance regions are gradually varied in the nanometric scale, whereby the guided-mode resonance filter has advantages of miniaturization and high resolution. Thus, the spectrometer of the present invention satisfies the requirement of miniaturization and portability. Further, the dispersive element of the present invention can be easily integrated with a smart phone or a biosensor to realize a miniature spectrometer.

What is claimed is:

1. A dispersive element, which is incorporated with an optical sensor and a computation unit to form a spectrometer, comprising: a guided-mode resonance filter including a plurality of resonance regions disposed along a direction vertical to tested light of a tested light source with an unknown spectrum, wherein said tested light source and said optical sensor are disposed at opposite sides of said guided-mode resonance filter, wherein each of said resonance regions respectively has having a different filter characteristic characteristics, each reflecting a first light beam of said tested light source or transmitting a second light beam of said tested light source to said optical sensor, wherein a wavelength of said first light beam is different from a wavelength of said second light beam, wherein said filter characteristics include a transmission efficiency matrix T containing i×j pieces of transmission elements, and wherein i is a count of said resonance regions, and wherein j is a count of reference light beams respectively having different known wavelengths, and wherein each said transmission element represents a transmission efficiency of one said reference light beam having one said wavelength in one said resonance region, and wherein each said transmission element is verified beforehand with said reference light beams having different known wavelengths to determine said transmission efficiency matrix T of said filter characteristics: wherein said optical sensor including a plurality of photosensitive regions respectively corresponding to said resonance regions, receiving said first light beams or said second light beams to acquire a light intensity distribution, wherein said light intensity distribution includes a light intensity matrix C containing i pieces of light intensity elements: i is a count of said resonance regions; and each said light intensity element represents a light intensity of said first light beam or said second light beam, which is detected by one said photosensitive region corresponding to one said resonance region: wherein said computation unit configured for working out a spectral data of said tested light source according to said light intensity distribution and said filter characteristics which are verified and stored beforehand in said computation unit, wherein said spectral data includes a frequency spectrum matrix I containing j pieces of frequency spectrum elements: j is a count of reference light beams respectively having different known wavelengths; and each said frequency spectrum element denotes a dispersion intensity of said tested light source with said unknown spectrum, which is corresponding to one said wavelength of one said reference light beam; and wherein a transposed matrix $T^T$ of said transmission efficiency matrix and said light intensity matrix C are obtained via measurement: and said computation unit obtains said frequency spectrum matrix I according to an equation $C=I \cdot (T^T)$.

2. The dispersive element according to claim 1, wherein said resonance regions are disposed along said direction and have gradually-decreasing resonance frequencies.

3. The dispersive element according to claim 1 further comprising an optical element, which is disposed at a light input side of said guided-mode resonance filter and guides said tested light source to said resonance regions.

4. The dispersive element according to claim 3, wherein said optical element includes a collimator lens or an optical fiber.

5. The dispersive element according to claim 1 further comprising:
- a housing having a slit or an aperture, wherein said guided-mode resonance filter and said slit/aperture are oppositely disposed in said housing; and
- a collimator lens disposed between said guided-mode resonance filter and said slit/aperture.

6. The dispersive element according to claim 1 further comprising:
- a first optical fiber including a first light input and a first light output, wherein an external light is input into said first optical fiber through said first light input, guided by said first optical fiber and output from said first light output to a tested sample for generating tested light of said tested light source; and
- a second optical fiber including a second light input and a second light output, wherein said tested light is input into said second optical fiber through said second light input, guided by said second optical fiber and output from said second light output to said guided-mode resonance filter.

7. The dispersive element according to claim 6 further comprising an isolator, whereby a first light output segment of said first optical fiber and a second light input segment of said second optical fiber are integrated into a fiber segment.

8. The dispersive element according to claim 6, wherein said guided-mode resonance filter is connected with said second light output.

9. The dispersive element according to claim 1, wherein said guided-mode resonance filter includes a photonic crystal.

10. The dispersive element according to claim 1, wherein said guided-mode resonance filter includes a waveguide grating structure formed via disposing a dielectric layer on a light permeable layer, wherein a refractive index of said dielectric layer is greater than a refractive index of said light permeable layer.

11. The dispersive element according to claim 10, wherein said dielectric layer is made of a material selected from a group including $TiO_2$, $SiN_x$, ZnO, $ZrO_2$, $Ta_2O_5$, $Nb_2O_5$, and $HfO_2$.

12. The dispersive element according to claim 10, wherein said tested light source has a special polarization direction.

13. A spectrometer comprising: a guided-mode resonance filter including a plurality of resonance regions disposed along a direction vertical to tested light of a tested light source with an unknown spectrum, wherein said tested light source and said optical sensor are disposed at opposite sides of said guided-mode resonance filter, wherein each of said resonance regions respectively has a different filter characteristic, each reflecting a first light beam of said tested light source or transmitting a second light beam of said tested light source, wherein a wavelength of said first light beam is different from a wavelength of said second light beam; and wherein said filter characteristics include a transmission efficiency matrix T containing i×j pieces of transmission elements: i is a count of said resonance regions: j is a count of reference light beams respectively having different known wavelengths: each said transmission element represents a transmission efficiency of one said reference light beam having one said wavelength in one said resonance region, and wherein each said transmission element is verified beforehand with said reference light beams having a different known wavelengths to determine said transmission efficiency matrix T of said filter characteristics: an optical sensor including a plurality of photosensitive regions respectively corresponding to said resonance regions, receiving said first light beams or said second light beams to acquire a light intensity distribution; and a computation unit configured for working out a spectral data of said tested light source according to said light intensity distribution and said filter characteristics which are verified and stored beforehand in said computation unit; wherein said light intensity distribution includes a light intensity matrix C containing i pieces of light intensity elements; i is a count of said resonance regions; each said light intensity element represents a light intensity of said first light beam or said second light beam, which is detected by one said photosensitive region corresponding to one said resonance region; and said spectral data includes a frequency spectrum matrix I containing j pieces of frequency spectrum elements; j is a count of reference light beams respectively having different known wavelengths; each said frequency spectrum element denotes a dispersion intensity of said tested light source with said unknown spectrum, which is corresponding to one said wavelength of one said reference light beam; and wherein a transposed matrix $T^T$ of said transmission efficiency matrix and said light intensity matrix C are obtained via measurement; said computation unit obtains said frequency spectrum matrix I according to an equation $C=I \cdot (T^T)$.

14. The spectrometer according to claim 13, wherein said resonance regions are disposed along said direction and have gradually-decreasing resonance frequencies.

15. The spectrometer according to claim 13, wherein said dispersive element further includes an optical element, which is disposed at a light input side of said guided-mode resonance filter and guides said tested light source to said resonance regions.

16. The spectrometer according to claim 15, wherein said optical element includes a collimator lens or an optical fiber.

17. The spectrometer according to claim 13, wherein said dispersive element further includes:
  a housing having a slit or an aperture, wherein said guided-mode resonance filter and said slit/aperture are oppositely disposed in said housing; and
  a collimator lens disposed between said guided-mode resonance filter and said slit/aperture.

18. The spectrometer according to claim 13 further comprising:
  a first optical fiber including a first light input and a first light output, wherein an external light is input into said first optical fiber through said first light input, guided by said first optical fiber and output from said first light output to a tested sample for generating tested light of said tested light source; and
  a second optical fiber including a second light input and a second light output, wherein said tested light is input into said second optical fiber through said second light input, guided by said second optical fiber and output from said second light output to said guided-mode resonance filter.

19. The spectrometer according to claim 18 further comprising an isolator, whereby a first light output segment of said first optical fiber and a second light input segment of said second optical fiber are integrated into a fiber segment.

20. The spectrometer according to claim 18, wherein said guided-mode resonance filter is connected with said second light output.

21. The spectrometer according to claim 13, wherein said guided-mode resonance filter includes a photonic crystal.

22. The spectrometer according to claim 13, wherein said guided-mode resonance filter includes a waveguide grating structure formed via disposing a dielectric layer on a light permeable layer, wherein a refractive index of said dielectric layer is greater than a refractive index of said light permeable layer.

23. The spectrometer according to claim 22, wherein said dielectric layer is made of a material selected from a group including $TiO_2$, $SiN_x$, $ZnO$, $ZrO_2$, $Ta_2O_5$, $Nb_2O_5$, and $HfO_2$.

24. The spectrometer according to claim 13, wherein said optical sensor includes a charge coupled device.

25. The spectrometer according to claim 13, wherein said tested light source has a special polarization direction.

* * * * *